United States Patent [19]

Elbert et al.

[11] Patent Number: 5,806,805
[45] Date of Patent: Sep. 15, 1998

[54] FAULT TOLERANT ACTUATION SYSTEM FOR FLIGHT CONTROL ACTUATORS

[75] Inventors: Ralph P. Elbert, Bothell; Michael A. Hafner, Renton, both of Wash.

[73] Assignee: The Boeing Company, Seattle, Wash.

[21] Appl. No.: 693,956

[22] Filed: Aug. 7, 1996

[51] Int. Cl.[6] .................................................. B64C 13/42
[52] U.S. Cl. ....................... 244/195; 244/76 A; 244/227; 701/3
[58] Field of Search ................................ 244/75 R, 76 R, 244/194, 195, 76 A, 220, 221, 226, 227, 229; 364/423.098, 424.012, 424.016, 424.021; 701/3

[56] References Cited

U.S. PATENT DOCUMENTS

| | | |
|---|---|---|
| 3,679,156 | 7/1972 | Redmond, Jr. . |
| 3,898,916 | 8/1975 | Renner et al. . |
| 4,079,906 | 3/1978 | Durandeau et al. . |
| 4,130,241 | 12/1978 | Meredith et al. . |
| 4,345,191 | 8/1982 | Takats et al. . |
| 4,398,242 | 8/1983 | Buus . |
| 4,472,780 | 9/1984 | Chenoweth et al. . |
| 4,542,679 | 9/1985 | Murphy et al. . |
| 4,567,813 | 2/1986 | Garnjost . |
| 4,807,516 | 2/1989 | Takats . |
| 4,887,214 | 12/1989 | Takats et al. ....................... 244/194 X |
| 5,036,469 | 7/1991 | Pelton . |
| 5,374,014 | 12/1994 | Traverse et al. ......................... 244/227 |
| 5,670,856 | 9/1997 | Le et al. ............................. 244/76 R X |

Primary Examiner—William Grant
Attorney, Agent, or Firm—Christensen, O'Connor, Johnson & Kindness PLLC

[57] ABSTRACT

A fault tolerant actuation system (12) for flight control systems is provided. The fault tolerant actuation system (12) includes a plurality of primary flight computers (14a, 14b, and 14c) with corresponding power control units (24a, 24b, and 24c). Each power control unit includes a remote electronic unit (18a, 18b, and 18c), an electro-hydraulic servo valve (26a, 26b, and 26c), and an actuator (28a, 28b, and 28c). The actuators are linked to a flight control surface (30) to control its position. The electro-hydraulic servo valves (26a, 26b, and 26c) and the actuators (28a, 28b, and 28c) include sensors that monitor their operation. Each RE (18a, 18b, and 18c) generates a control current ($i_1$, $i_2$, and $i_3$) based upon commands of the corresponding primary flight computer as well as feedback data transmitted from the sensors of the corresponding electro-hydraulic servo valve and actuator only. The feedback data is transmitted along separate servo loops having separate compensations (66a, 70a). A current equalization control (34a, 34b, and 34c) equalizes the control currents with one another. A force fight equalization control (36a, 36b, and 36c) equalizes the forces of the actuators with one another.

22 Claims, 8 Drawing Sheets

FLUX SUM ARCHITECTURE
SURFACE RESPONSE FOR
NORMAL AND FAILURE OPERATION
(INCLUDES WORST CASE GAIN AND BIAS TOLERANCE ERRORS BETWEEN CHANNELS)

FLUX SUM ARCHITECTURE
ACTUATOR FORCE FIGHT FOR
NORMAL AND FAILURE OPERATION
(INCLUDES WORST CASE GAIN AND BIAS TOLERANCE ERRORS BETWEEN CHANNELS)

FAULT TOLERANT ACTUATION SYSTEM FOR FLIGHT CONTROL ACTUATORS

FIELD OF THE INVENTION

This invention relates to airplane flight control systems and, more particularly, to fault tolerant flight control systems providing the ability to operate normally in the presence of a fault.

BACKGROUND OF THE INVENTION

In recent years, flight control systems have been the object of much effort directed toward enhancing the reliability and survivability of aircraft during flight. Flight control systems translate commands from a pilot, autopilot, and other automatic controls into mechanical, hydraulic or electric control signals that control the position of aircraft flight control surfaces so that the desired flight path is achieved.

In recent years, fly-by-wire flight control systems have in large part replaced mechanical flight control systems. In contrast to complex mechanical assemblies requiring cables and other mechanical components to transmit pilot commands to the control surfaces, fly-by-wire flight control systems convert a pilot's commands into electrical signals that, when combined with other data, control flight control surfaces. In fly-by-wire flight control systems, a pilot's commands are translated into electrical signals through the use of transducers that sense the pilot's inputs. The electrical signals produced by the transducers are fed to a flight computer, along with other data indicative of flight parameters. Based upon the data it receives, the flight computer generates signals designed to achieve the desired flight path commanded by the pilot. These signals, called flight control surface commands, are transmitted electrically, in typical fly-by-wire control systems, to actuator controller units.

The actuator controller units control the movement of the aircraft flight control surfaces in response to the flight control surface commands and feedback data obtained by monitoring various output parameters indicative of the operation and position of the flight control surface. In this regard, actuator controller units output a control signal to electro-hydraulic servo valves that drive associated hydraulic actuators connected to the flight control surface. The signal path between the actuator controller unit and the electro-hydraulic servo valve can be defined as a control channel. The control signals transmitted over a control channel direct the associated flight control surface to the desired position.

Maintaining the normal operation of control channels in flight control systems is vital to proper aircraft control. In the event of control channel failure, the resulting loss of control over a flight control surface could jeopardize aircraft control. Because loss of control is of high concern, the response to control channel failure in flight control systems has been addressed in many ways. Various approaches to compensate for control channel failure have been attempted. For example, it has become conventional to devote several redundant control channels and actuators to a flight control surface. Under this conventional approach, failure of a single channel does not necessarily result in the loss of control over a flight control surface, thereby creating a degradation of aircraft control.

During the normal operation of conventional flight control systems, each control channel commands its associated actuator such that the flight control surface is moved in substantially the same way by each actuator. In the event of a channel failure, this approach could result in an actuator directing the flight control surface to an uncommanded position, jeopardizing aircraft control. Conventional flight control systems rely on the actuators of non-failed control channels to effectively counter the tendency of a flight control surface to follow the commands of the failed control channel until monitors in the control channel can detect the failure and shut down the failed channel. Such control systems rely on the stiffness of actuators commanded by non-failed control channels to, in effect, suppress the counteracting forces generated by the failed control channel and its corresponding actuator.

The suppression of the commands produced by a failed control channel in this way has some disadvantages. The opposing movements of the sister actuators caused by the non-failed and failed control channels results in a competition to direct the flight control surface to different positions, thereby creating force fight. Force fights are undesirable because they lead to flight control surface flexure. Flight control surface flexure causes premature structural fatigue in flight control surfaces.

Conventional techniques employed to address the structural fatigue produced by force fights can be penalizing. Specifically, in order to maintain structural integrity in view of their vulnerability to force fights, flight control surfaces have been reinforced with metal and other materials. While such reinforcement strengthens flight control surfaces and helps them to withstand the flexure forces caused by force fights, this technique adds weight to the aircraft and thus unduly diminishes its payload capacity.

Another disadvantage of this method is the requirement that the monitors quickly detect and react to the failure condition. The threshold and persistence of the failure monitors must be set to restrictive values. Their margin with hardware tolerances inherent in the aircraft control system may become relatively small. As a result, the safety thresholds and the tolerances sometimes overlap. When this occurs, safety thresholds may cause the flight control system to declare a failure when, in fact, no control channel failure has actually occurred, i.e., a nuisance trip. The occurrence of nuisance trips provides uncertainty as to the proper operation of aircraft during flight, and undesirably prompts an unnecessary shut down of a non-failed control channel.

Other solutions to block channel failures and failures at the actuator have been developed and used in military aerospace applications. Illustrating a simplified functional block diagram of one such possible solution, FIG. 1 includes three primary flight computers (PFCs) 300a, 300b, and 300c; a common databus 301; three remote electronic units 304a, 304b, and 304c designated RE#1, RE#2 and RE#3; three electro-hydraulic servo valves 306a, 306b, and 306c designated EHSV#1, EHSV#2 and EHSV#3; three actuators 308a, 308b, and 308c designated ACTR#1, ACTR#2 and ACTR#3; a control surface 310; and three databuses 302a, 302b, and 302c. Although FIG. 1 illustrates a system having three actuators and three REs, it will be appreciated that some conventional military flight control systems include four actuators and four REs, i.e., a quadraplex aircraft flight control system. The first primary flight computer 300a transmits flight control surface commands to RE#1 over the first databus 302a; the second primary flight computer 300b transmits flight control surface commands to RE #2 over the second databus 302b; and the third primary flight computer 300c transmits flight control surface commands to the RE #3 over the third databus 302c. The primary flight computers share data over the common databus 301. Based upon flight control surface commands and other feedback data, the REs send control currents to the electro-hydraulic servo valves which, in turn, control the position of the actuators. In a conventional military flight control system, a series of sensors (not shown) are positioned within the electrohydraulic servo valves and in the actuators. The sensors determine whether the control surface 310, as well as other components, are operating properly or have achieved their commanded positions. The sensors generate feedback signals that are transmitted to the REs, as described in more detail below.

Because the system illustrated in FIG. 1 is redundant, only a partial description sufficient to understand the operation of the conventional military flight control system follows. As indicated by the lines designating signal paths for the various current signals, each RE sends a control current designated $i_{n,m}$ from the RE #n to the electro-hydraulic servo valve #m. Similarly, each actuator sends a feedback signal designated $f_{n,m}$ from the actuator #n to the RE #m. More specifically, RE #1 sends control current $i_{11}$ to the EHSV#1 306a; RE #1 sends control current $i_{12}$ to the EHSV#2; and RE #1 sends control current $i_{13}$ to the EHSV#3 306c. In a similar manner, RE #2 and RE #3 each send control currents to each of the electro-hydraulic servo valves. As briefly mentioned above, the electrohydraulic servo valves 306a, 306b, and 306c and the actuators 308a, 308b, and 308c contain sensors for monitoring output parameters. For each output parameter to be monitored, three sensors, i.e., triplex sensors, are required for each pairing of an electro-hydraulic servo valve with its associated actuator. These sensors generate feedback signals that are transmitted back to the REs to provide loop closure. More specifically, a first sensor monitoring an output parameter of EHSV #1 and the ACTR #1 sends a feedback signal $f_{11}$ to RE #1 to provide loop closure with the circuit generating control current signal $i_{11}$; a second sensor for monitoring the output parameter of EHSV #1 and ACTR #1 sends a feedback signal $f_{12}$ to RE #2 to provide loop closure with the circuit generating control signal $i_{21}$; a third sensor for monitoring the output parameter of EHSV #1 and ACTR #1 sends a feedback signal $f_{13}$ to RE #3 to provide loop closure with the circuit generating control current $i_{31}$. Loop closure is indicated by the broken lines connecting a feedback signal to a control current. Similarly, EHSV #2 and ACTR #2, as well as EHSV #3 306c and ACTR #3 308c, each contain three sensors generating three corresponding feedback signals in the manner described above.

The signal path of a control current and its associated feedback signal defines a control channel. Accordingly, in the illustrated conventional military flight control system, nine control channels are present. The multitude of control channels retains the availability of the control surface if a control channel failure occurs by providing a substantial number of remaining control channels. While functionally adequate, a flight control system of the type shown in FIG. 1 has drawbacks due to the complexity resulting from such extensive redundancy.

As reflected in the architecture of the conventional military flight control system, the availability of a flight control system can be improved by merely increasing the number of redundant components. Practically, several factors limit the extent of redundancy in flight control systems. First, minimizing aircraft weight is normally desirable to maximize payload capacity. The extra weight resulting from the use of redundant components unduly increases aircraft weight. In addition, it is desirable to reduce the cost of aircraft systems (including maintenance and manufacturing). The use of redundant components undesirably multiplies by several times the cost of these systems.

As will be appreciated from the foregoing description, there is a need for flight control systems that provide the necessary fault tolerance without unnecessarily increasing costs. The present invention is directed to meeting this need by providing a fault tolerant actuator system in a flight control system that overcomes the foregoing and other disadvantages of previously developed flight control systems.

SUMMARY OF THE INVENTION

In accordance with this invention, a fault tolerant actuation system for a flight control system is provided. The fault tolerant actuation system is ideally suited to provide normal operation in the presence of a failure and to prevent force fights and unwanted surface motion on flight control surfaces resulting from control channel failures and tolerance variations. The fault tolerant actuation system includes a plurality of primary flight computers with corresponding power control units. Each power control unit includes a remote electronic unit (RE), an electro-hydraulic servo valve, and an actuator. The plurality of actuators are linked to a flight control surface to direct its motion. The electro-hydraulic servo valves and the actuators include sensors that monitor their operation. Each RE generates a control current based upon commands of the corresponding primary flight computer and feedback data transmitted from the sensors of the corresponding electro-hydraulic servo valve and actuator only. Each control current is then transmitted to every electro-hydraulic servo valve to direct the associated actuator so that the flight control surface achieves the desired position. As a result, each actuator receives a control current from each RE. With flux summing, the control currents from each RE are summed by the electro-hydraulic servo valve. Therefore, an aberrant control current from a failed channel is negated by the control current in the non-failed channels. This provides the architecture for flux summing.

In accordance with other aspects of this invention, the control currents are equalized with one another.

In accordance with further aspects of this invention, a sensor monitors the pressure of the actuators against the flight control surface and feedbacks a signal indicative thereof In accordance with yet other aspects of this invention, the pressures of the actuators against the flight control surface are equalized.

In accordance with yet still further aspects of this invention, the electro-hydraulic servo valves each include a trim coil for receiving a trim current to equalize the pressures of the actuators against the flight control surface.

In accordance with yet still other aspects of this invention, the trim function (ΔP equalization) has less authority than any of the control functions.

In accordance with yet other further aspects of this invention, an actuator sensor produces a signal indicative of the actuator position. The signal is fed back along a servo loop having a compensation.

In accordance with yet further other aspects of this invention, an electro-hydraulic servo valve sensor produces a signal indicative of the electro-hydraulic servo valve position. The signal is fed back along another servo loop that also has compensation.

As will be readily appreciated from the foregoing summary, the invention provides a new fault tolerant actuation system for flight control systems. Because the electro-hydraulic servo valve and actuator feedback data to only the corresponding RE of the same power control unit, a simplex system of sensors can be utilized to substantially reduce the complexity and costs associated with conventional military type actuation systems. Because any one control channel is blocked by the remaining normal control channels with insignificant surface motion or force fight, stress and fatigue on an aircraft structure are greatly reduced. Therefore, safety thresholds on aircraft can be relaxed so that nuisance trips are minimized.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
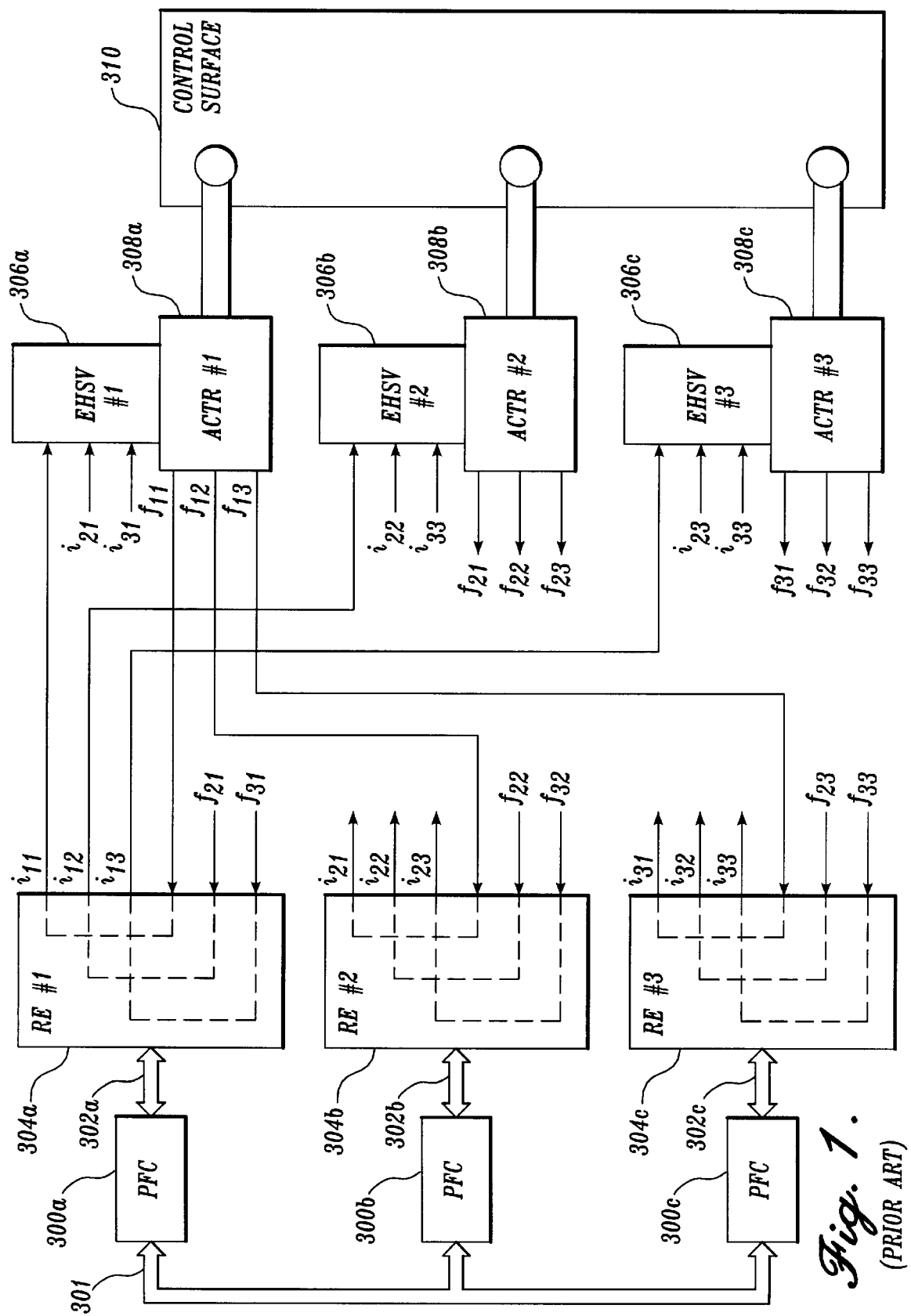
FIG. 1 is a simplified block diagram of a prior art flight control system.
Figure 2:
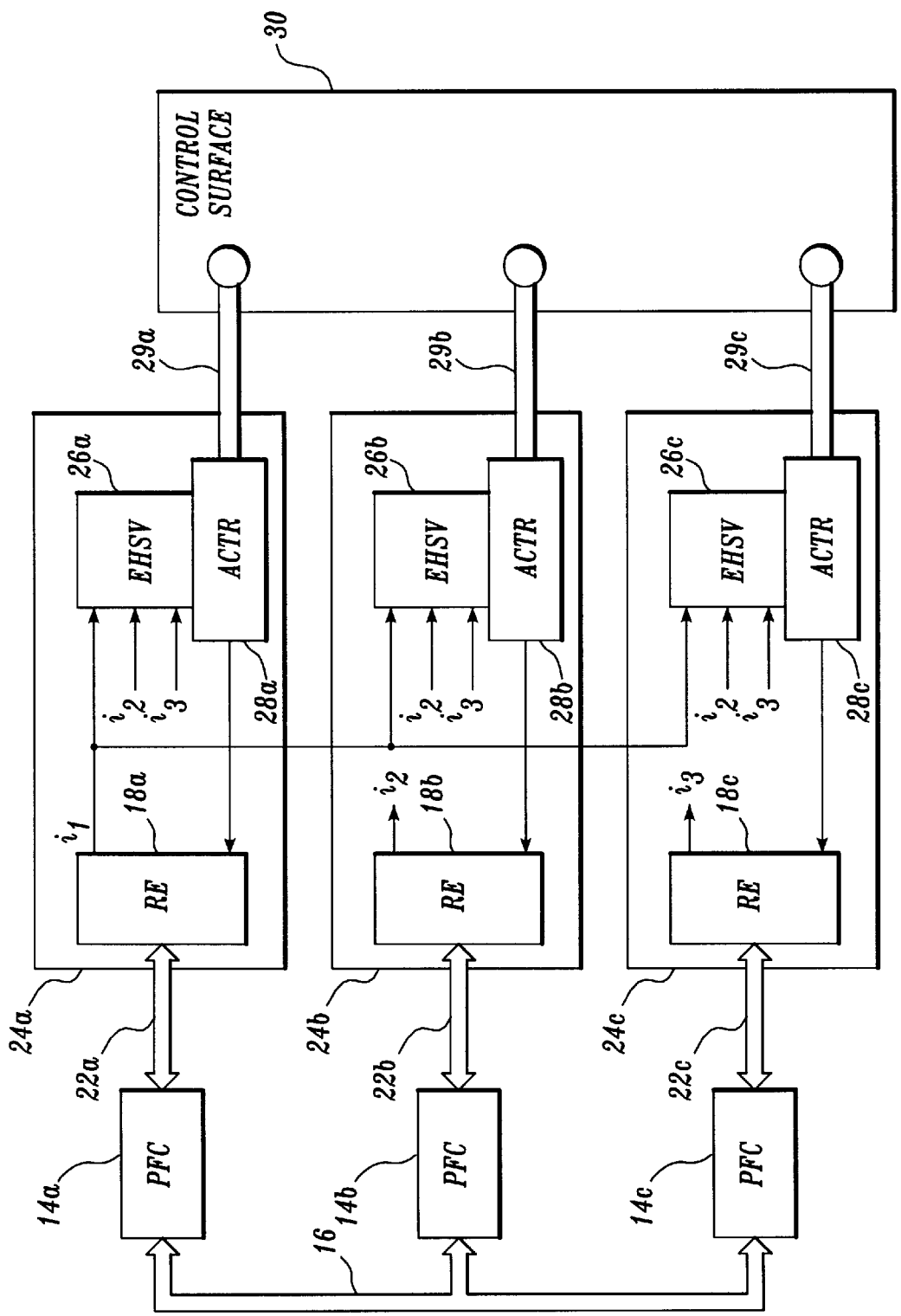
FIG. 2 is a simplified block diagram of a fault tolerant actuation system for flight control actuators formed in accordance with the present invention.

FIG. 2 is a simplified functional block diagram of the architecture of a fault tolerant actuation system 12 for flight control actuators formed in accordance with this invention. The illustrated fault tolerant actuation system 12 is ideally suited for controlling the position of an aircraft's flight control surface by using a flux summing architecture. The fault tolerant actuation system 12 achieves normal performance in the presence of a fault by utilizing failure blocking and minimizing force fight.

The fault tolerant actuation system 12 illustrated in FIG. 2 includes: three primary flight computers 14a, 14b, and 14c; flight controls databuses 16 over which the primary flight computers share data; three channel databuses 22a, 22b, and 22c; three power control units 24a, 24b, and 24c; and a flight control surface 30. Each power control unit 24a, 24b, 24c includes a remote electronic unit 18a, 18b, 18c an electro-hydraulic servo valve (EHSV) 26a, 26b, 26c and an actuator (ACTR) 28a, 28b, 28c. Each of the actuators 28a, 28b, and 28c include a ram 29a, 29b and 29c that positions the control surface 30.

The primary flight computers 14a, 14b, and 14c each generate all of the flight control surface commands based on pilot or autopilot control signals which dictate the position of the actuators. The primary flight computers 14a, 14b, and 14c also generate current equalization commands and force fight equalization commands as described in more detail below.

Actuator commands generated by each primary flight computer are transmitted to the corresponding power control unit through channel databuses 22a, 22b, 22c. The coupling of a primary flight computer with its associated power control unit defines a control channel. The electrical isolation among the control channels minimizes the potential for failure propagation. The first primary flight computer 14a transmits actuator commands to the RE 18a of its associated power control unit 24a over the first channel databus 22a. The second primary flight computer 14b transmits actuator commands to the RE 18b of its associated power control unit 24b over the second channel databus 22b. The third primary flight computer 14c transmits actuator commands to the RE 18c of its associated power control unit 24c over the third channel databus 22c. While, preferably, the channel databuses 22a, 22b, and 22c are ARINC 429 communication links, which are standard in the aircraft industry, other types of data communication links can be used. After the actuator commands are received by the REs 18a, 18b, and 18c, each RE processes the actuator commands, along with other feedback data, to generate a control current in response to the received commands and feedback data. The RE 18a of the first power control unit 24a generates control current $i_1$; the RE 18b of the second power control unit 24b generates control current $i_2$; and the RE 18c of the third power control unit 24c generates control current $i_3$. Each control current is generated independently of the other control currents. The control currents are transmitted to all of the electro-hydraulic servo valves 26a, 26b, and 26c. Thus, each electrohydraulic servo valve receives control current $i_1$, control current $i_2$, and control current $i_3$.

As will be described in more detail below, the control currents, along with a trim coil, are flux-summed to control the net torque on the armature of each electro-hydraulic servo valve to achieve the desired position of the corresponding actuator. The electro-hydraulic servo valve 26a of the first power control unit 24a controls the actuator 28a of the first unit; the electro-hydraulic servo valve 26b of the second power control unit 24b controls the actuator 28b second unit; and the electro-hydraulic servo valve 26c of the third power control unit 24c controls the actuator 28c of that unit.

The flight control surface 30 is moved by the actuators 28a, 28b, and 28c to the commanded position for desired aircraft flight. The flight control surface 30 could be, for example, an aileron, a rudder, or an elevator.

As will be described in more detail below, output parameters monitored by sensors in each power control unit are fed back to the corresponding RE in the same power control unit. More specifically, feedback signals indicating the status of the monitored output parameters are transmitted from the actuator 28a and the electro-hydraulic servo valve 26a of the first power control unit 24a to the RE 18a of that unit, from the actuator 28b, and the electro-hydraulic servo valve 26b of the second power control unit 24b to the RE 18b of that unit, and from the actuator 28c and the electro-hydraulic servo valve 26c of the third power control unit 24c to the RE 18c of that unit. The feedback signals generated in a power control unit are transmitted back to the RE of the same power control unit only.

Figure 3:
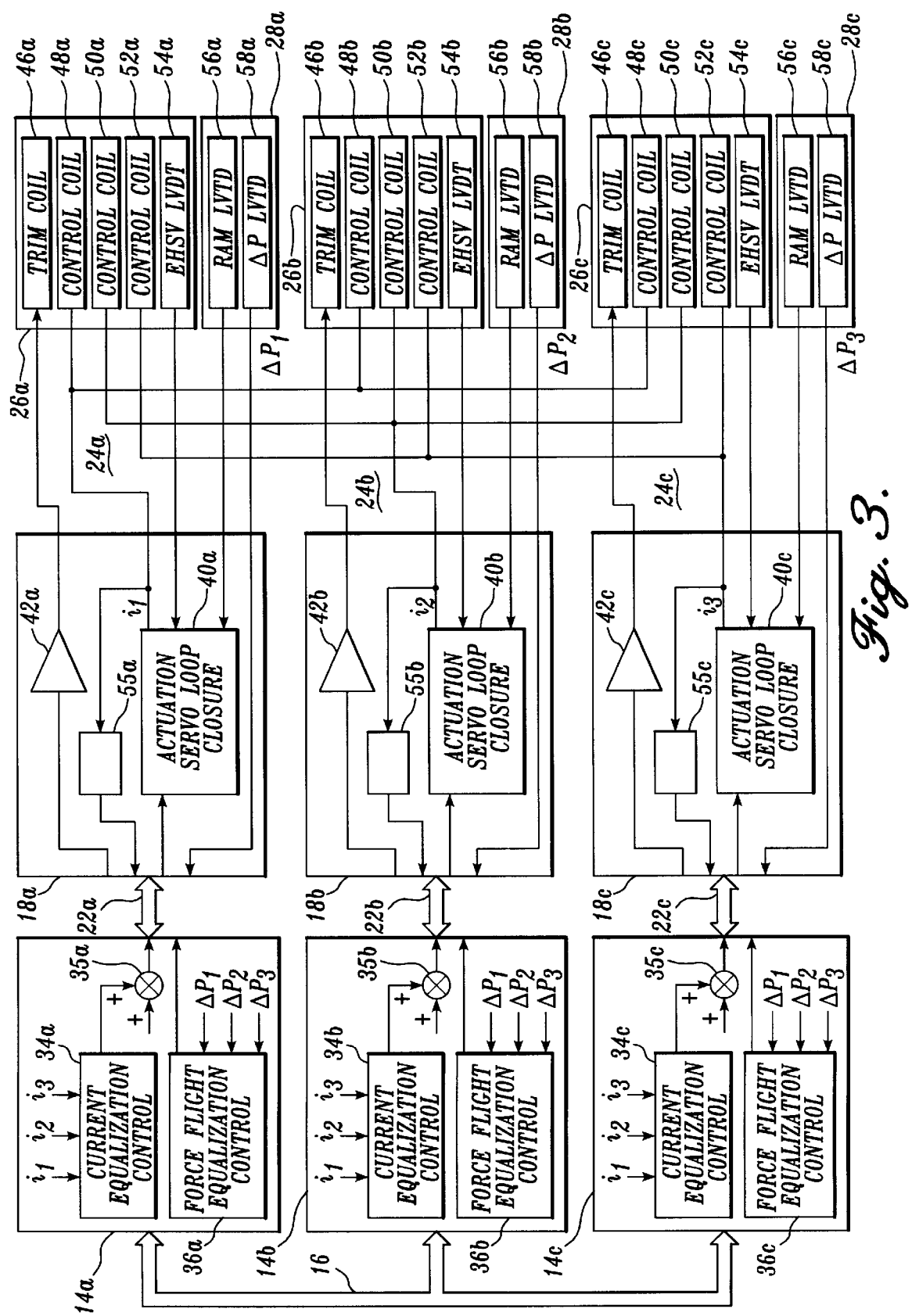
FIG. 3 is a block diagram of the fault tolerant actuation system for flight control actuators formed in accordance with the present invention.

As shown in more detail in FIG. 3, the primary flight computers 14a, 14b, and 14c each include a current equalization control 34a, 34b, and 34c and a force fight equalization control 36a, 36b, 36c. The primary flight computers 14a, 14b, and 14c also each include summation block 35a, 35b, 35c.

The REs 18a, 18b, and 18c of the power control units 24a, 24b, and 24c each include a trim coil amplifier 42a, 42b, 42c, current sensors 55a, 55b, 55c, and an actuator servo loop closure 40a, 40b, 40c. As also shown in FIG. 3, the electro-hydraulic servo valves 26a, 26b, and 26c of the power control units 24a, 24b, and 24c each include a trim coil 46a, 46b, 46c; three control coils 48a, 48b, 48c, 50a, 50b, 50c, and 52a, 52b, 52c; and an electro-hydraulic servo valve linear variable differential transformer (LVDT) 54a, 54b, 54c. The actuators 28a, 28b, 28c, of the power control units 24a, 24b, 24c each include a ram LVDT 56a, 56b, 56c LVDT 58a, 58b, 58c.

As shown in FIG. 3, the control current $i_1$ is sensed by the sensor 55a and transmitted from the RE 18a of the first power control unit 24a over the first channel databus 22a to the first primary flight computer 14a; the control current $i_2$ is sensed by the sensor 55b and transmitted from the RE 18b of the second power control unit 24b over the second channel databus 22b to the second primary flight computer 14b; and the control current $i_3$ is sensed by the sensor 55c and transmitted from the RE 18c of the third power control unit 24c over the third channel databus 22c to the third primary flight computer 14c. The sensed control current values $i_1$, $i_2$, and $i_3$ are transmitted over the flight controls databuses 16 to the other (non-receiving) primary flight computers 14a, 14b, and 14c. Thus, each current equalization control 34a, 34b, and 34c receives all of the sensed control currents $i_1$, $i_2$, and $i_3$, and each current equalization control processes $i_1$, $i_2$, and $i_3$ to generate an actuator command bias. The actuator command bias created by each current equalization control 34a, 34b, and 34c is then combined with a surface command (produced by the related primary flight computer 14a, 14b, or 14c in a conventional manner) at the summation blocks 35a, 35b, and 35c. The output of the summation blocks 35a, 35b, and 35c, i.e., the actuator commands, are then transmitted from the primary flight computers 14a, 14b, and 14c, via the channel databuses 22a, 22b, and 22c to the related power control unit 24a, 24b or 24c.

As will be described in more detail below, a ΔP signal, $\Delta P_1$, corresponding to the differential pressure in the actuator 28a of the first power control unit 24a is transmitted through the RE 18a of that power control unit and over the first channel databus 22a to the first primary flight computer 14a. ΔP signal A $\Delta P_2$ corresponding to the differential pressure in the actuator 28b of the second power control unit 24b is transmitted through the RE 18b of that power control unit and over the second channel databus 22b to the second primary flight computer 14b. A ΔP signal $\Delta P_3$ corresponding to the differential pressure in the actuator 28c of the third power control unit 24c is transmitted through the RE 18c of that power control unit and over the third channel databus 22c to the third primary flight computer 14c. The ΔP signals $\Delta P_1$, $\Delta P_2$, and $\Delta P_3$ are transmitted over the common flight control databuses 16 to each of the other (non-receiving) primary flight computers 14a, 14b, and 14c. Thus, each force fight equalization control 36a, 36b, and 36c receives all of the ΔP signals $\Delta P_1$, $\Delta P_2$, and $\Delta P_3$. The force fight equalization control processes the $\Delta P_1$, $\Delta P_2$, and $\Delta P_3$ signals to generate a trim current command. The trim current command produced by the force fight equalization control 36a, 36b, and 36c are transmitted across the first, second and third channel databuses 22a, 22b, and 22c, respectively, to their related power control unit. The trim current commands are input to the trim coil amplifier 42a, 42b, or 42c of the related power control unit. The trim coil amplifier 42a of the first power control unit 24a outputs a trim current $i_{t1}$ which flows through the trim coil 46a of the electro-hydraulic servo valve 26a of that unit; the trim coil amplifier 42b of the second power control unit 24b outputs a trim current $i_{t2}$ which flows through the trim coil 46b of the electro-hydraulic servo valve 26b of that unit; and the trim coil amplifier 42c of the third power control unit 24c outputs a trim current $i_{t3}$ which flows through the trim coil 46c of the electro-hydraulic servo valve 26c of that unit.

Figure 5:
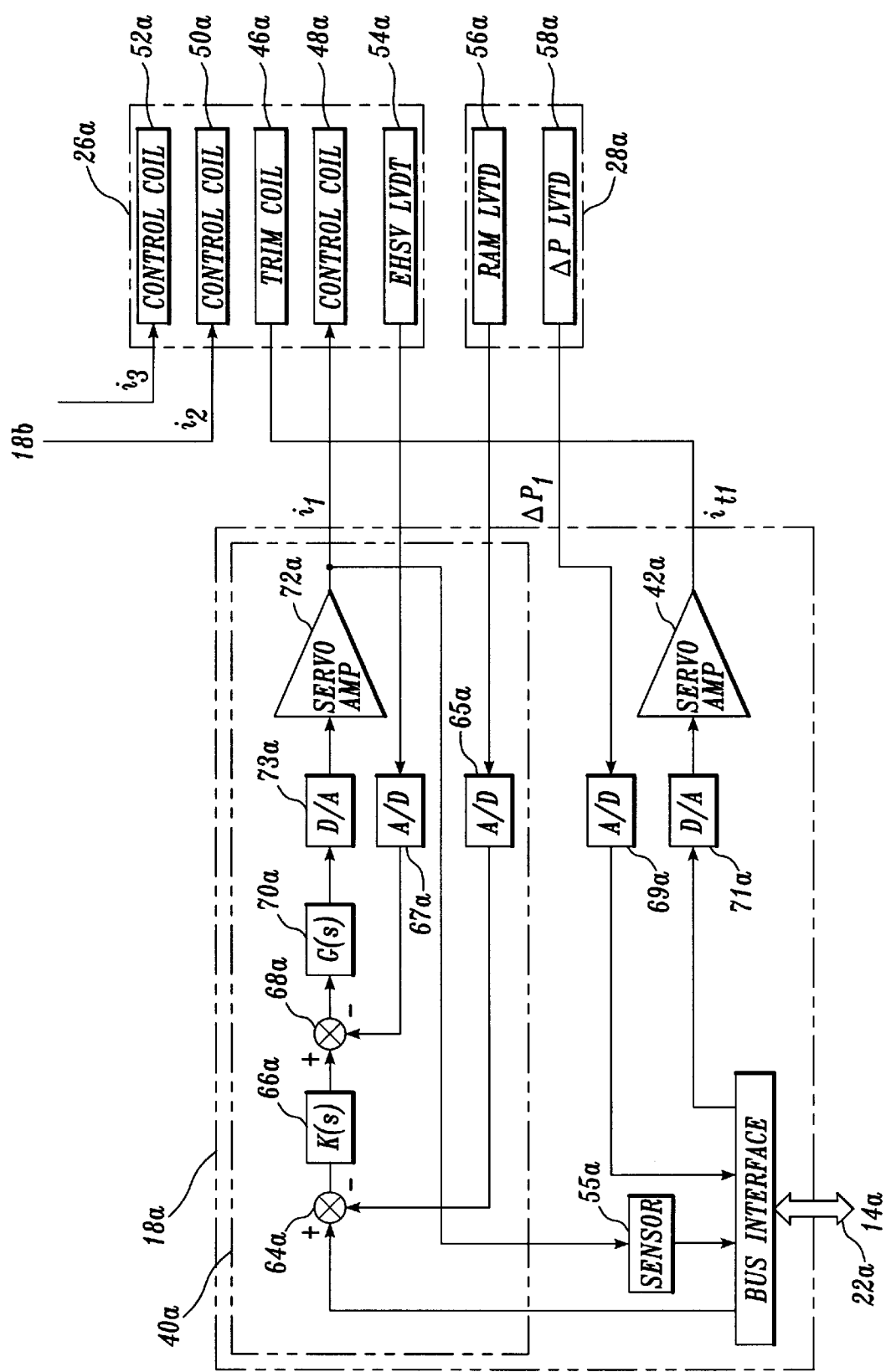
FIG. 5 is a block diagram of the control structure in a remote electronic unit (RE) suitable for use in the fault tolerant actuation system illustrated in FIGS. 2 and 3.

As shown in FIGS. 3 and 5, the control current $i_1$ is applied to a control coil 48a, 48b, and 48c in each of the electro-hydraulic servo valves 26a, 26b, and 26c; the control current $i_2$ is applied to a control coil 50a, 50b, and 50c in each of the electro-hydraulic servo valves 26a, 26b, and 26c; and the control current $i_3$ is transmitted to a control coil 52a, 52b, and 52c in each of the electro-hydraulic servo valves 26a, 26b, and 26c.

As will be described in more detail below in relation to FIG. 3, a plurality of sensors monitor the operation of the actuators 28a, 28b, and 28c and the electro-hydraulic servo valves 26a, 26b, and 26c. The electro-hydraulic servo valve LVDTs 54a, 54b, and 54c send feedback signals to the actuator servo loop closures 40a, 40b, and 40c of their related power control unit. Similarly, ram LVDTs 56a, 56b, and 56c send feedback signals to the actuator servo loop closures 40a, 40b, and 40c of their related power control unit. As briefly discussed above, ΔP sensors, namely LVDTs 58a, 58b and 58c send the ΔP signals $\Delta P_1$, $\Delta P_2$, and $\Delta P_3$ respectively to the REs 18a, 18b, and 18c of their related power control unit.

Because the co-action of the primary flight computers 14a, 14b, and 14c with their associated power control units 24a, 24b, and 24c is virtually identical, it is to be understood that the following discussion of the first primary flight computer 14a and the first power control unit 24a applies equally to the second and third primary flight computers 14b, and 14c and the second and third power control units 24b, and 24c.

As stated above, the electro-hydraulic servo valve 26a of the first power control unit 24a includes an electro-hydraulic servo valve LVDT 54a. The electro-hydraulic servo valve LVDT 54a measures the spool position. The spool directs hydraulic flow into actuator 28a to control its position, as measured by the ram LVDT 56a. Both signals are fed back to the actuator servo loop closure 40a of the power control unit 24a. The ΔP LVDT 58a measures the pressure on the ram. More specifically, the ΔP LVDT 58a measures the difference in pressure between one side of the ram and the other side and therefore provides an indication of the force of the actuator 28a against the control surface 30. The ΔP LVDT 58a generates a ΔP signal $\Delta P_1$ indicative of the pressure differential which is transmitted to the first primary flight computer 14a via the RE 18a of the first power control unit 24a and first channel databus 22a.

Figure 4:
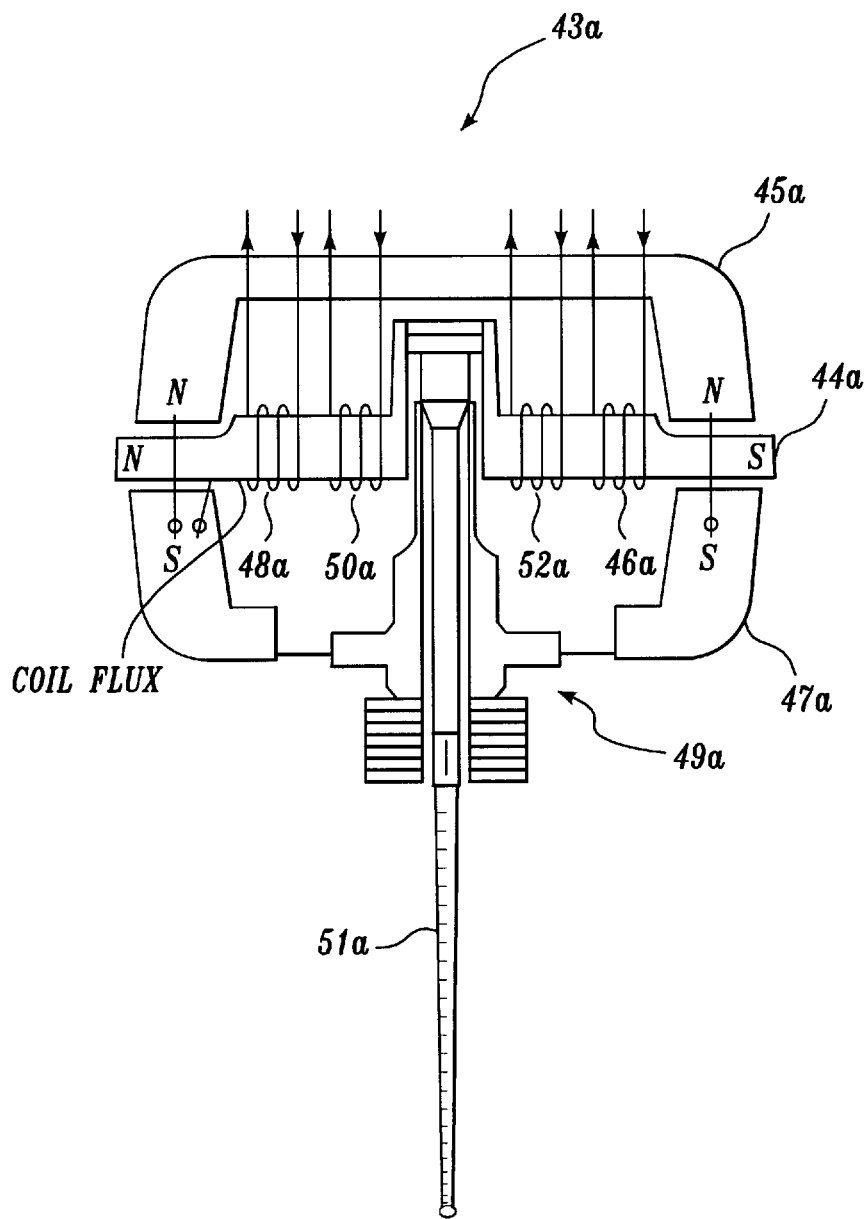
FIG. 4 is a simplified pictorial diagram of an electro-hydraulic servo valve suitable for use in the fault tolerant actuation system illustrated in FIGS. 2 and 3.

FIG. 4 is a simplified functional diagram of the first stage of one of the electro-hydraulic servo valves 26a, 26b, and 26c, namely the electro-hydraulic servo valve 26a of the first power control unit 24a. The other electro-hydraulic servo valves 26b, and 26c are configured and operated similarly. The purpose of the electro-hydraulic servo valves is to regulate the flow of hydraulic fluid to the related actuator to control the position of the ram of the actuator in response to the control current inputs. The illustrated first stage of an electro-hydraulic servo valve 26a comprises a torque motor 43a which includes: a north pole piece 45a; a south pole piece 47a; an armature 44a; the trim coil 46a; the control coils 48a, 50a, and 52a; a hydraulic amplifier 49a; and a feedback wire 51a. The control coils 48a, 50a, 52a and the trim coil 46a are wrapped around the armature 44a. Because the nature and operation of the torque motor operated electro-hydraulic servo valves is well-known by those skilled in this art and others, the structure of such devices are not described further here. Each of the coils are wound in the same direction on the armature 44 so that the current flowing through the coils flows in the same direction. Preferably, each of the control coils 48a, 50a, and 52a should be capable of carrying sufficient current to control the electro-hydraulic servo valve 26a by itself.

During operation of the fault tolerant actuator system 12, the control current $i_1$ flows through the control coil 48a associated with the related power control unit 24a; the control current $i_2$ flows through the control coil 50a associated with one of the other primary flight control units 24b; and the control current $i_3$ flows through the control coil 52a associated with the remaining power control unit 24c. Similarly, the trim current $i_{t1}$ flows through the trim coil 46a. The flow of the control currents through the coils on the armature 44a create a net magnetic flux in relation to the north pole piece 45a and the south pole piece 47a. The net magnetic flux, in turn, creates a torque on the armature 44a. As will be readily appreciated by those skilled in this art and others, the torque on the armature 44a causes the hydraulic amplifier 49a to become unbalanced, resulting in the movement of the hydraulic amplifier 49a. The hydraulic amplifier 49a directs hydraulic fluid to a spool (not shown). The feedback wire 51a indicates spool position by creating a resistive torque. This resistive torque is proportional to the position of the spool. The resistive torque counteracts the input torque, thereby creating a linear relationship between current and spool position.

FIG. 5 illustrates the RE 18a of the first power control unit 24a and, more specifically, the details of the actuator servo loop closure 40a of that RE. In addition to the trim coil amplifier 42a, the RE 18a includes a bus interface 62a, which is not shown in FIG. 3 for ease of drawing, and a sensor 63a. The actuator servo loop closure 40a of the RE 18a includes a first summer 64a, a K(s) compensation block 66a, a second summer 68a, a G(s) compensation block 70a, three analog-to-digital converters 65a, 67a, 69a, two digital-to-analog converters 71a, 73a, and a servo amplifier 72a. As discussed above, the first primary flight computer 14a sends data to the RE 18a. The AIRINC 429 bus interface 62a receives this data and also transmits data back to the primary flight computer 14a via the AIRINC 429 databus 22a. The actuator command from the bus interface 62a is digital in nature and is applied to the first summer 64a. In addition, a ram position signal generated by the ram LVDT 56a is converted to a digital signal by the analog-to-digital converter 65a and is applied to the first summer 64a. The feedback of the ram position signal provides actuator servo loop closure. The purpose of the actuator servo loop is to position the ram of the actuator 28a as dictated by the actuator command so that the flight control surface 30 achieves the desired position. The output of the first summer 64a is the difference between the actuator command and the ram position signal, i.e., an actuator position error signal. The actuator position error signal is then input into the K(s) compensation block 66a. The K(s) compensation block 66a applies a compensation to the actuation position error signal. The compensation is designed to meet actuation performance requirements that are application specific. As is well known by those skilled in this art and others, the compensation is dependent on actuator stiffness, actuator frequency bandwidth, and actuation stability requirements.

The output of the K(s) compensation block 66a, i.e., the spool position command, is applied to the second summer 68a. The spool position signal generated by the electro-hydraulic servo valve LVDT 54a is converted to a digital signal by the analog-to-digital converter 67a and is also applied to the second summer 68a. The feedback of the spool position signal provides electro-hydraulic servo valve loop closure. The electro-hydraulic servo valve loop is not required for conventional designs with the two-stage servo valves, but is required for this design to provide the compensation required to implement the failure blocking function of the fault tolerant actuator system 12, as described more fully below. The spool position signal is subtracted from the spool position command in the second summer 68a, generating a spool position error signal. The spool position error signal is applied to the G(s) compensation block 70a. The G(s) compensation block 70a provides electro-hydraulic servo valve stability and contributes to desired fault blocking performance. More specifically, fault blocking performance is directly related to achieving a large forward loop gain between the actuator position error signal and the control current $i_1$. Conventional fault blocking performance techniques are limited in achieving the desired forward loop gain because of actuator performance and stability considerations. In accordance with this invention, the G(s) compensation block provides a way of implementing a desirable high gain requirement without compromising the performance and stability of the actuator position loop.

The output of the G(s) compensation block 70a is converted to an analog signal by the digital-to-analog converter 73a, and is applied to the servo amplifier 72a. The servo amplifier 72a outputs a current with power sufficient to drive the electro-hydraulic servo valve 26a. In addition, the output of the servo amplifier 72a is impedance matched to the coils of the electro-hydraulic servo valves 26a, 26b, and 26c, that receive the output of the servo amplifier 72a, i.e., control current $i_1$. The sensed control current $i_1$ is also applied to the bus interface 62a where it is transmitted to the first primary flight computer 14a. The ΔP, signal $\Delta P_1$, generated by the ΔP LVDT 58a of the actuator 28a is converted to a digital signal by the analog-to-digital converter 69a and is applied to the bus interface 62a for transmission to the first primary flight computer 14a.

Figure 6:
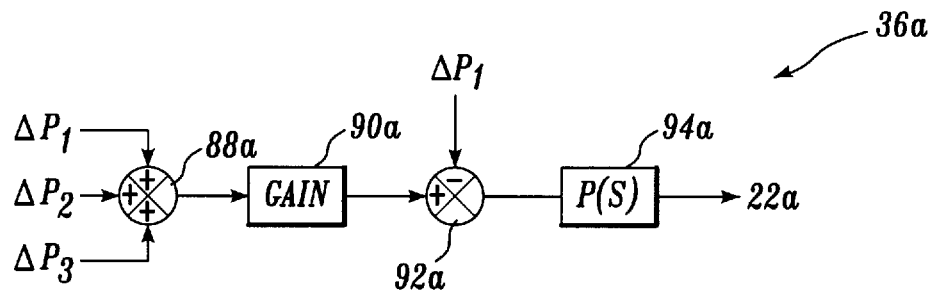
FIG. 6 is a block diagram of a force fight equalization control suitable for use in the fault tolerant actuation system illustrated in FIGS. 2 and 3.

FIG. 6 is a functional block diagram that illustrates how the force fight equalization control 36a, 36b, and 36c of the first, second, and third primary flight computers 14a, 14b, and 14c process the ΔP signals $\Delta P_1$, $\Delta P_2$, and $\Delta P_3$. Since each force fight equalization control functions in a similar manner, only one, namely the one associated with the first primary flight computer 14a, is shown in FIG. 6. The force fight equalization control 36a includes a three-input summer 88a, a gain block 90a, a two-input summer 92a, and a P(s) compensation block 94a. All of the ΔP signals, $\Delta P_1$, $\Delta P_2$, and $\Delta P_3$, are applied to the three-input summer 88a where they are added together. The output of the three-input summer 88a is applied to the gain block 90a which divides the added signals by a factor of three to create an average pressure signal. The divided signal is then applied to the two-input summer 92a. The local channel pressure, $\Delta P_1$, is also applied to the two-input summer 92a, which subtracts $\Delta P_1$ from the divided signal. The output of the two-input summer 92a is a ΔP error signal. The ΔP error signal is applied to the P(s) compensation block 94a. The P(s)

compensation block 94a provides the gains required by the force fight equalization control 36a. As will be appreciated by those skilled in this art and others, the gain is such that force fight equalization is achieved in the time necessary for a given application. As shown in FIG. 6, the output of the P(s) compensation block 94a, i.e., the trim current command, is transmitted to RE 18a via the bus 22a and is converted from a digital signal to an analog signal by the digital-to-analog converter 71a.

The trim coil amplifier 42a amplifies the trim current command to a level that is sufficient to drive the electro-hydraulic servo valve with the intended authority, as discussed below. The resulting trim current $i_{t1}$, of the force fight equalization control 36a serves to equalize the pressures in the local actuator 28a, with respect to its sister actuators 28b and 28c in a way that minimizes force fights. More specifically, the forces of each actuator against the flight control surface are ideally equal. However, due to tolerance variations among control channels, the actuators may attempt to direct the flight control surface with slightly different forces, thereby resulting in a force fight. The function of the trim currents is to adjust the output of the actuators 28a, 28b, and 28c in response to the actual pressure applied by each actuator so that the actuators direct the flight control surface in a uniform manner. By equalizing the forces applied by the actuators against the flight control surface, the actuator and fatigue issues associated with force fight are avoided. Because the tolerances of the control channels typically vary in flight control systems, the trim currents will accordingly vary in value with one another. Therefore, each electro-hydraulic servo valve of each actuator must be biased by its associated trim current independently from the other electro-hydraulic servo valves to equalize the forces applied by each actuator.

The trim current $i_{t1}$ has limited authority so that the force fight equalization control 36a is not a source of system failure causing unacceptable control surface motion. Preferably, the trim current $i_{t1}$, is limited in authority to 10–20% of the authority of each of the control currents $i_1$, $i_2$, and $i_3$. The limited authority of the trim current $i_{t1}$ can be achieved by limiting the output of the trim coil amplifier 42a or by reducing the number of windings on the trim coil 46a in the electro-hydraulic servo valve 26a.

Figure 7:
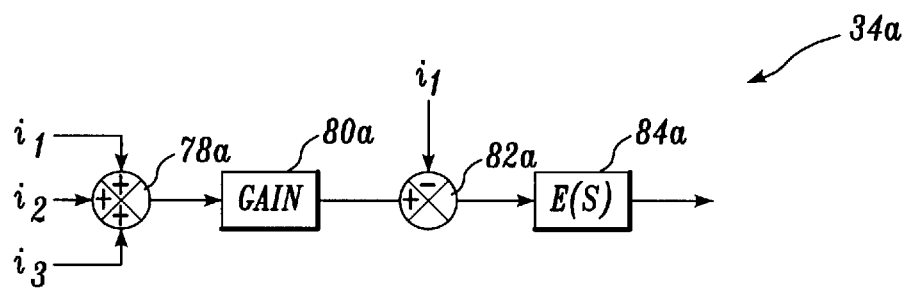
FIG. 7 is a block diagram of a current equalization control suitable for use in the fault tolerant actuation system illustrated in FIGS. 2 and 3.

FIG. 7 is a functional block diagram illustrating the current equalization control of one of the primary flight computers, namely, the current equalization control 34a of the first primary flight computer. Since the other current equalization controls 34b, and 34c are identical, they are not described. The illustrated current equalization control 34a includes a three-input summer 78a, a gain block 80a, a two-input summer 82a, and an E(s) compensation block 84a. The purpose of the current equalization control 34a is to equalize the control currents $i_1$, $i_2$, and $i_3$ such that failure blocking performance is maximized. Because of tolerance variations among control channels, the control currents will vary in value. It is desirable to have monitoring values such that control currents in the non-failed channels have sufficient control margin to overcome the control current from a failed channel. Control currents $i_1$, $i_2$, and $i_3$ are applied to the three-input summer 78a. The summation block 78a adds the control currents and outputs their sum. The gain block divider 80a receives the summed currents and divides the sum by a factor of three to obtain an average current value. The average current value is applied to the two-input summer 82a. The control current $i_1$ is applied to the other input of the two-input summer 82a which subtracts it from the sum. The difference, a control current equalization error, is applied to the E(s) compensation block 84a.

The E(s) compensation block 84a adds gain to the control current equalization error. The gain considerations relating to the E(s) compensation block 84a are driven by current equalization requirements. Such considerations include, for example, how quickly the control currents $i_1$, $i_2$, and $i_3$ must be equalized and what degree of accuracy must be achieved during the equalization operation. More specifically, the gain of the E(s) compensation block 84a is based on the worst case tolerance stack-up and desired failure blocking performance. The output of the E(s) compensation block 84a is an actuator command bias. The actuator command bias is combined with the surface command at the summation block 35a, shown in FIG. 3 and described above. In this way, control current equalization is accomplished by biasing the actuator commands in the primary flight computers 14a, 14b, and 14c in response to the control current equalization error.

Figure 8:
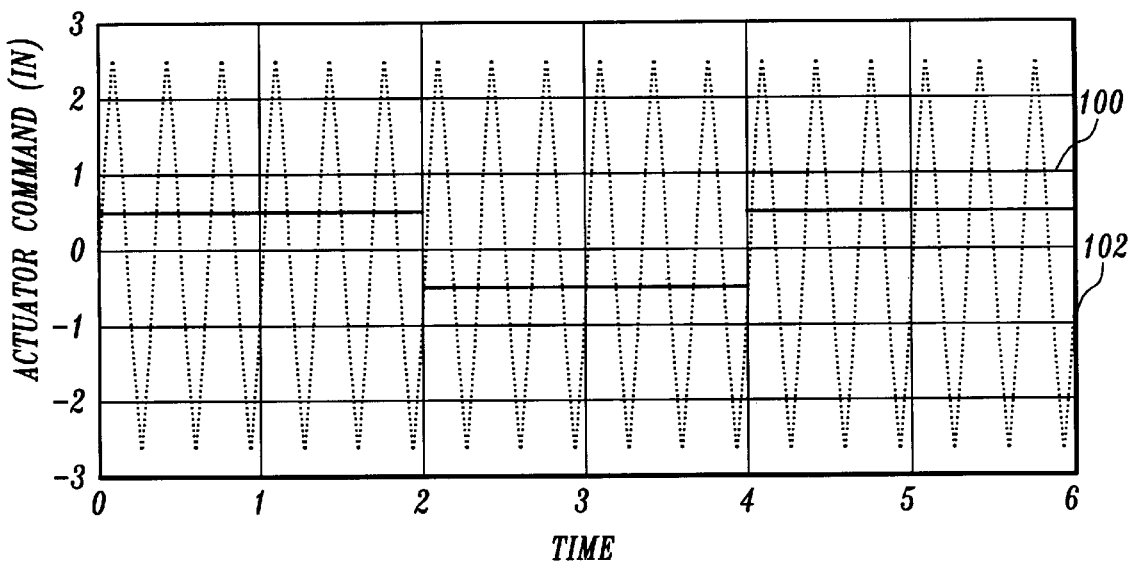
FIGS. 8–11 are a series of graphs illustrating the performance of one actual embodiment of the invention.
Figure 9:
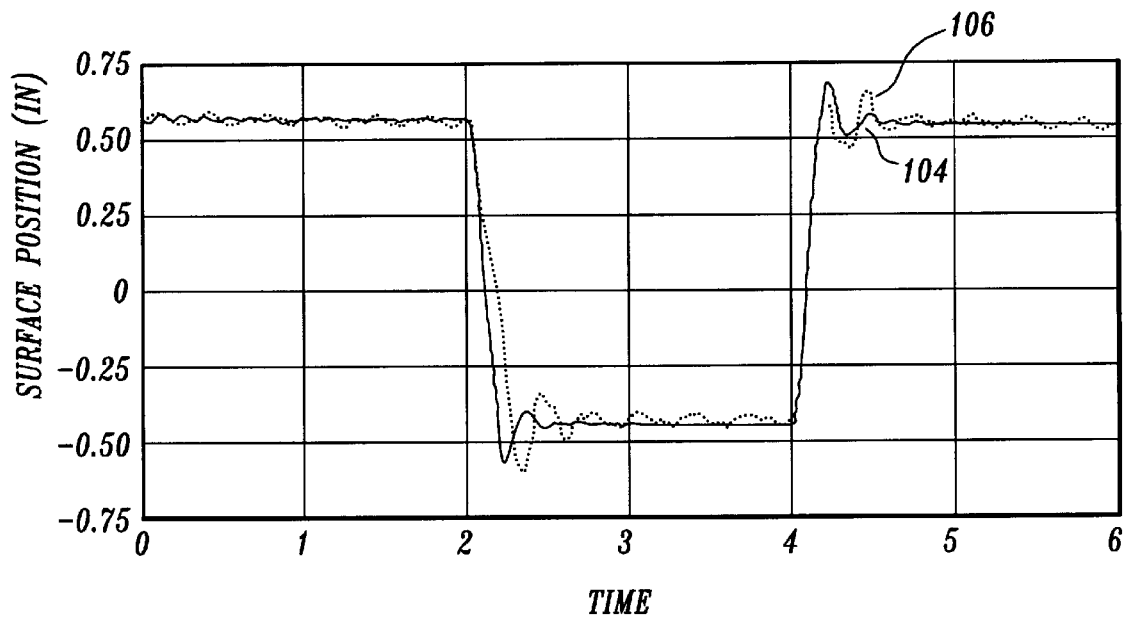

A high fidelity, non-linear computer simulation model of the fault tolerant actuation system 12 formed in accordance with the invention was developed. The model included greater than double the worst case expected tolerance stack-up errors between the channels. FIGS. 8 and 9 are graphs of the results of the simulation model. In FIG. 8, the abscissa indicates the variation of time in seconds and the ordinate indicates the actuator command in inches. As shown by line 100, the three actuators were commanded with ±0.5 inch steps during normal operation. In this regard, during the 0–2 second interval, the actuators were commanded to a position of 0.5 inches. During the 2–4 second interval, the actuators were commanded to a position of –0.5 inches. During the interval of 4–6 seconds, the actuators were commanded to a position of 0.5 inches. Line 104 in FIG. 9 represents the response of the fault tolerant actuation system 12 to the actuator commands indicated by line 100 in FIG. 8. The abscissa indicates the variation of time in seconds and the ordinate indicates the surface position of the flight control surface 30 in inches. As shown by line 104 in FIG. 9, the surface position response of the flight control surface 30 substantially follows the actuator commands. Because of simulated bias and gain tolerances, the surface position is not identical to the actuator command. It will be appreciated by those skilled in this art and others that the damped oscillations occurring on line 104 after times zero, 2, and 4 seconds result normally from the interaction of distributed surface mass and actuation/structural spring. Line 102 of FIG. 8 represents an oscillatory failure condition where one actuator is commanded with a ±2.5 inch sinusoidal waveform having a frequency of 3.0 Hz with the other two actuators commanded to a ±0.5-inch square wave similar to line 100. Line 106 of FIG. 9 illustrates the surface position response of the control surface as a result of the oscillatory failure condition. The failure response results in a surface oscillation amplitude of only ±0.02 inches of surface position, which translates to ±0.2 degrees of flight control surface motion. As will be readily appreciated by those skilled in this art, from a review of FIGS. 8 and 9, when compared with other conventional flight control systems, the fault tolerant actuation system 12 formed in accordance with this invention has relatively low surface position motion due to oscillatory failure conditions. Conventional flight control systems experiencing oscillatory failure conditions typically result in surface position values that are in order of magnitude greater, i.e., ±2.0 degrees.

Figure 10:
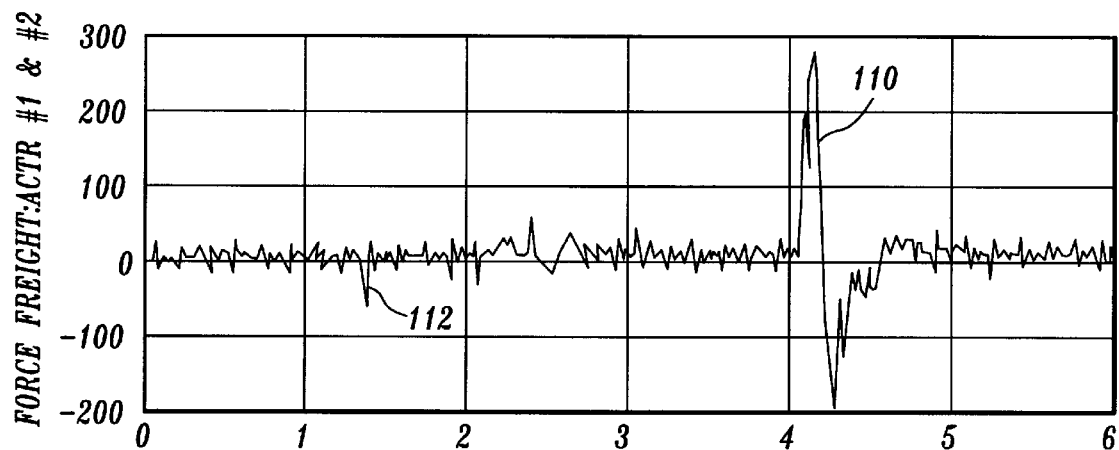
Figure 11:
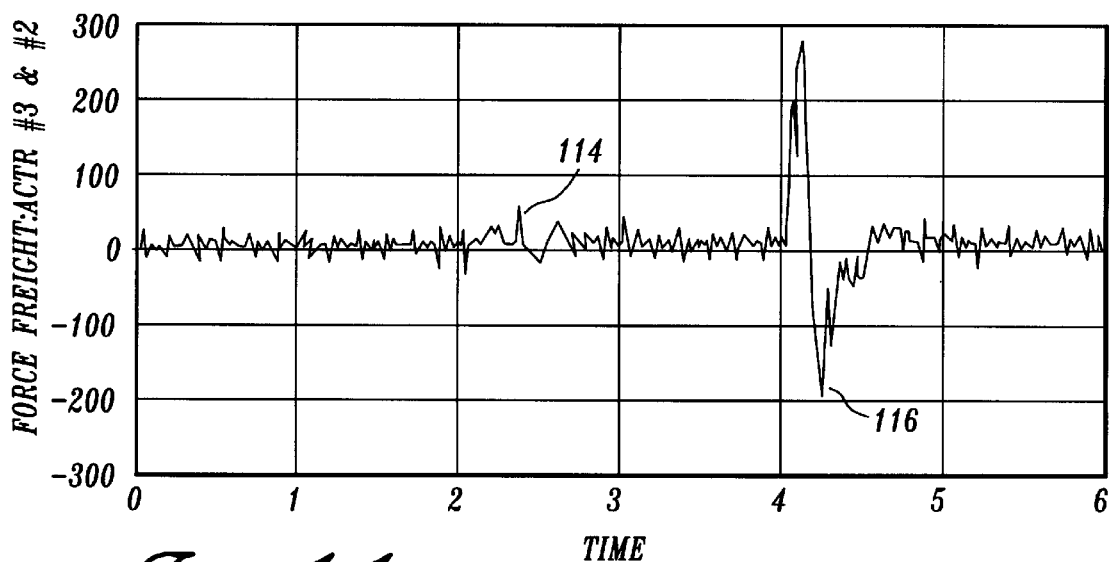

FIGS. 10 and 11 are graphs illustrating the expected force fight for the same operating conditions described with respect to FIGS. 8 and 9. The abscissa of the graph illustrated in FIG. 10 indicates the variation of time in seconds and the ordinate represents the force fight between actuators #1 and #2 in psi. Line 110 depicts the force fight during normal operating conditions represented by lines 100 and 104 in FIGS. 8 and 9. Line 112 illustrates the force fight in response to the oscillatory failure condition. Similarly, the graph in FIG. 11 illustrates the force fight between actuators #2 and #3. The abscissa indicates the variation of time in seconds and the ordinate represents the force fight between actuators #2 and #3 in psi. Line 114 in the graph of FIG. 11 illustrates the force fight during normal operation. Line 116 illustrates the force fight resulting from the oscillatory failure condition. As will be readily appreciated by those skilled in this art and others, the force fight between actuators #1 and #3 may be derived from the graphs in FIGS. 10 and 11. Review of FIGS. 9 and 10 indicates the oscillatory failure condition in the fault tolerant actuation system 12 formed in accordance with the invention will not cause significant force fight. Because significant force fight does not result, the structural integrity of the control surface is maintained without the structural fatigue resulting from conventional flight control systems. In conventional flight control systems, the oscillatory failure condition would result in a force fight oscillation amplitude of greater than 4,500 psid and a frequency of 3 Hz. Thus, conventional flight control systems result in unacceptable levels of structural fatigue in a very short time period, in contrast to the fault tolerant actuation system 12 formed in accordance with this invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fault tolerant actuation system for a flight control system comprising:

a plurality of primary flight computers, each of said plurality of primary flight computers generating an actuator command to direct the position of a flight control surface;

a plurality of power control units, each of said plurality of power control units coupled to a corresponding primary flight computer of said plurality of primary flight computers for receiving the actuator commands of the corresponding primary flight computer and controlling the flight control surface, each of said plurality of power control units including:

an actuator having a ram for moving the flight control surface;

an electro-hydraulic servo valve having a plurality of control coils and an armature for directing the position of a spool that controls the position of the ram of said actuator;

a plurality of sensors for producing feedback signals indicative of the operation of said actuator and said electro-hydraulic servo valve;

a remote electronic unit (RE) for processing the actuator commands and the feedback signals to generate a control current, said RE applying the control current to a predetermined one of said plurality of control coils of all of said electro-hydraulic servo valves of the fault tolerant actuation system thereby contributing to the net magnetic flux capable of imparting a torque on the armature of said electro-hydraulic servo valve to direct the position of the spool;

a trim coil amplifier for inputting a trim current to said electro-hydraulic servo valve; and a plurality of servo loops for forwarding the feedback signals from said plurality of sensors to said RE.

2. The fault tolerant actuation system as claimed in claim 1, wherein each of said plurality of primary flight computers performs control current equalization that substantially equalizes the values of the control currents generated by each said RE.

3. The fault tolerant actuation system as claimed in claim 2, wherein said plurality of sensors of each of said plurality of power control units comprises a $\Delta P$ sensor that produces a $\Delta P$ feedback signal indicative of the pressure on the ram.

4. The fault tolerant actuation system as claimed in claim 3, wherein each of said plurality of primary flight computers performs force fight equalization by receiving the $\Delta P$ feedback signal generated by each said $\Delta P$ sensor, substantially equalizing the values of the pressures on the rams of each said actuator with one another and generating a trim current.

5. The fault tolerant actuation system as claimed in claim 4, wherein each said electro-hydraulic servo valve includes a trim coil for receiving said trim current.

6. The fault tolerant actuation system as claimed in claim 5, wherein the trim current has less authority than the control current generated by each said RE.

7. The fault tolerant actuation system as claimed in claim 6, wherein said plurality of sensors comprises a ram sensor that produces a ram position signal indicative of the position of the ram, said plurality of servo loops comprising an actuator position loop for receiving the ram position signal, said actuator position loop including first compensation means for compensating an actuator position error signal to generate a spool position command, the actuator position error signal being the difference of the ram position signal and the actuator command.

8. The fault tolerant actuation system as claimed in claim 7, wherein said plurality of sensors comprises an electro-hydraulic servo valve sensor that produces a spool position signal indicative of the position of the spool, said plurality of servo loops comprising an electro-hydraulic servo valve loop for receiving the spool position signal, said electro-hydraulic servo valve loop including second compensation means for compensating for the error in said spool position signal, the error in said spool position signal being the difference of the spool position signal and the spool position command, said second compensation means distinct from said first compensation means.

9. The fault tolerant actuation system as claimed in claim 1, wherein said plurality of sensors of each of said plurality of power control units comprises a $\Delta P$ sensor that produces a $\Delta P$ feedback signal indicative of the pressure on the ram.

10. The fault tolerant actuation system as claimed in claim 9, wherein each of said plurality of primary flight computers provides a force fight equalization by receiving the $\Delta P$ feedback signal generated by each said $\Delta P$ sensor, substantially equalizing the values of the pressures on the rams of each said actuator with one another and generating a trim current.

11. The fault tolerant actuation system as claimed in claim 10, wherein each said electro-hydraulic servo valve comprises a trim coil for receiving said trim current.

12. The fault tolerant actuation system as claimed in claim 11, wherein the trim current has less authority than the control current generated by each said RE.

13. The fault tolerant actuation system as claimed in claim 1, wherein said plurality of sensors comprises a ram sensor that produces a ram position signal indicative of the position of the ram, said plurality of servo loops comprising an actuator position loop for transmitting the ram position signal, said actuator position loop including first compensation means for amplifying an actuator position error signal to generate a spool position command, the actuator position error signal being the combination of the ram position signal and the actuator command.

14. The fault tolerant actuation system as claimed in claim 13, wherein said plurality of sensors comprises an electro-hydraulic servo valve sensor that produces a spool position signal indicative of the position of the spool, said plurality of servo loops comprising an electro-hydraulic servo valve loop for transmitting the spool position signal, said electro-hydraulic servo valve loop including second compensation means for amplifying a spool position error signal, the spool position error signal being the combination of the spool position signal and the spool position command, said second compensation means distinct from said first compensation means.

15. A method of providing a fault tolerant actuation system for flight control actuators, comprising:

producing actuator commands, said actuator commands indicative of the desired position of a flight control surface;

transmitting said actuator commands to a plurality of power control units, each of said plurality of power control units including a remote electronic unit (RE), an electro-hydraulic servo valve, and an actuator having a ram which directs the flight control surface to the desired position;

sensing the operation of said electro-hydraulic servo valve and said actuator of each of said plurality of power control units;

generating feedback signals indicative of the operation of said electro-hydraulic servo valve and said actuator of each of said plurality of power control units;

transmitting said feedback signals from said electro-hydraulic servo valve and said actuator of each of said plurality of power control units only to said RE corresponding thereto to form a plurality of servo loops;

generating a control current in each said RE of said plurality of power control units in response to said feedback signals and said actuator commands; and transmitting said control current from each said RE of said plurality of power control units to each said electro-hydraulic servo valve of said plurality of power control units.

16. The method of claim 15 further comprising the step of equalizing the values of the control currents generated by said REs of said plurality of power control units with one another.

17. The method of claim 15 wherein said sensing step includes sensing the pressures of said rams of said actuators, said pressures of said rams indicative of the forces of said rams against said flight control surface.

18. The method of claim 17 further comprising the step of equalizing said pressures of said rams with one another.

19. The method of claim 18 further comprising the step of transmitting a trim current to each said electro-hydraulic servo valve of said plurality of power control units so that said pressures of said rams are equalized.

20. The method of claim 19 wherein said trim current has less authority than each said control current.

21. The method of claim 15 wherein said transmitting said feedback signals from said electro-hydraulic servo valve and said actuator of each of said plurality of power control units to said RE corresponding thereto to form a plurality of servo loops comprises the substeps of:

generating a ram position signal indicative of the position of the ram in an actuator position loop; and amplifying an actuator position error signal indicative of the error of said position of said ram in said actuator position loop to generate a spool position command.

22. The method of claim 21 wherein said transmitting said feedback signals from said electro-hydraulic servo valve and said actuator of each of said plurality of power control units to said RE corresponding thereto to form a plurality of servo loops comprises;

generating a spool position signal indicative of the position of the spool in an electro-hydraulic servo valve loop; and amplifying a spool position error signal indicative of the error of the position of a spool in said electro-hydraulic servo loop, said spool position error signal being the combination of said spool position signal and said spool position command.

* * * * *